United States Patent
Parker et al.

(10) Patent No.: US 9,336,068 B2
(45) Date of Patent: May 10, 2016

(54) THROTTLING OF APPLICATION ACCESS TO RESOURCES

(71) Applicant: Apple Inc., Cupertino, CA (US)

(72) Inventors: Anthony Stephan Parker, San Jose, CA (US); Christopher Jon Kane, San Jose, CA (US); Ali T. Ozer, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 14/077,131

(22) Filed: Nov. 11, 2013

(65) Prior Publication Data

US 2014/0366040 A1     Dec. 11, 2014

Related U.S. Application Data (60) Provisional application No. 61/832,735, filed on Jun. 7, 2013.

(51) Int. Cl.
    *G06F 3/00*        (2006.01)
    *G06F 9/44*        (2006.01)
    *G06F 9/46*        (2006.01)
    (Continued)

(52) U.S. Cl.
    CPC .......... *G06F 9/542* (2013.01); *G06F 2209/545* (2013.01)

(58) Field of Classification Search
    CPC ....................................................... G06F 9/542
    USPC ....................................................... 719/318
    See application file for complete search history.

(56) References Cited

U.S. PATENT DOCUMENTS

| 6,078,942 A | 6/2000 | Eisler et al. |
| 6,260,150 B1 * | 7/2001 | Diepstraten et al. .......... 713/323 |
| 7,191,349 B2 | 3/2007 | Kaushik et al. |

(Continued)

FOREIGN PATENT DOCUMENTS

| TW | 200413889 | 6/2005 |
| WO | WO 2010/097885 A1 | 9/2010 |

OTHER PUBLICATIONS

PCT International Search Report and Written Opinion of the International Searching Authority for PCT/US2014/038277, mailed Sep. 2, 2014.

(Continued)

*Primary Examiner* — Timothy A Mudrick
(74) *Attorney, Agent, or Firm* — Blakely, Sokoloff, Taylor & Zafman LLP (57) ABSTRACT

A method and apparatus of a device that modifies an application sleep state of a running application is described. In an exemplary embodiment, the device detects an event associated with the running application. In addition, the device evaluates one or more run-time characteristics of the running application. The device further determines if the running application is a candidate to have the application sleep state of this running application modified based on the monitored one or more run-time characteristics of the running application and the detected event. If the running application is a candidate to have the application sleep state of this running application modified, the device sends a message to the operating system of the device indicating how the application sleep state of the running application is to be modified, where the device includes a virtual memory subsystem that pages data of the running application between volatile storage to non-volatile storage.

16 Claims, 8 Drawing Sheets

(51) Int. Cl.
*G06F 13/00* (2006.01)
*G06F 9/54* (2006.01)

(56) References Cited

U.S. PATENT DOCUMENTS

| | | | |
|---|---|---|---|
| 7,281,145 | B2 | 10/2007 | Merkin et al. |
| 7,827,358 | B2 | 11/2010 | Watson et al. |
| 8,375,393 | B2 | 2/2013 | Sankaranarayan et al. |
| 8,538,997 | B2 | 9/2013 | Arrouye et al. |
| 2005/0009505 | A1* | 1/2005 | Triebel ................... 455/411 |
| 2005/0026654 | A1* | 2/2005 | Perez et al. ............. 455/556.2 |
| 2007/0150759 | A1* | 6/2007 | Srinivasan et al. .......... 713/300 |
| 2007/0197196 | A1 | 8/2007 | Shenfield et al. |
| 2008/0062917 | A1 | 3/2008 | Oguchi |
| 2008/0250415 | A1 | 10/2008 | Illikkal et al. |
| 2009/0036108 | A1* | 2/2009 | Cho ........................... 455/418 |
| 2009/0204963 | A1 | 8/2009 | Swart et al. |
| 2011/0249668 | A1* | 10/2011 | Van Milligan et al. ....... 370/352 |
| 2011/0252423 | A1* | 10/2011 | Freedman et al. ............ 718/100 |
| 2011/0252429 | A1* | 10/2011 | Ballard et al. ................ 718/103 |
| 2011/0252430 | A1* | 10/2011 | Chapman et al. ............. 718/107 |
| 2012/0047509 | A1 | 2/2012 | Ben-Itzhak |
| 2012/0122527 | A1 | 5/2012 | Fyke |

OTHER PUBLICATIONS

PCT Chapter I International Preliminary Report on Patentability (IPRP Chapter I) PCT/US2014/038277 mailed Dec. 8, 2015 (10 Pages).

* cited by examiner

THROTTLING OF APPLICATION ACCESS TO RESOURCES

FIELD OF INVENTION

This invention relates generally to application management and more particularly to throttling application access to device resources.

BACKGROUND OF THE INVENTION

A running application on a device can access one or more device resources during the application run-time. For example, an application can use a central processing unit (CPU) to process the instructions of the application, write to or read from input/output (I/O) resources, use operating system timers, play audio, access connected devices (e.g., camera, microphone), and/or use graphics resources of the device. The amount of resources that the application can access is set by the operating system. For example, the operating system can set I/O priority and CPU priority for both a percentage use of the CPU and CPU frequency.

A problem can arise because, as the application continues to run, the application may be using resources to run but is not being interacted by a user. For example, an application that is running in the foreground performing window drawing updates (e.g., animations or other updates), may be put in the background by selecting another application as the foreground application, or by partially or fully occluding this application window. However, the application will still consume the same device resources at the same rate. For example, the application could be updating a window at the same rate even though the window is partially or fully occluded such that these updates are not or only partially seen by the user. It would be useful to restrict the amount of device resources being used if the application is not currently doing work important to the user.

SUMMARY OF THE DESCRIPTION

A method and apparatus of a device that modifies an application sleep state of a running application is described. In an exemplary embodiment, the device detects an event associated with the running application. In addition, the device evaluates one or more run-time characteristics of the running application. The device further determines if the running application is a candidate to have the application sleep state of this running application modified based on the monitored one or more run-time characteristics of the running application and the detected event. If the running application is a candidate to have the application sleep state of this running application modified, the device sends a message to the operating system of the device indicating how the application sleep state of the running application is to be modified, where the device includes a virtual memory subsystem that pages data of the running application between volatile storage to non-volatile storage.

In another embodiment, the device receives an application sleep state message from the running application, where the application sleep state message includes a directive about how to modify an application sleep state. In addition, the device modifies the application sleep state of the running application based on the directive.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device that modifies an application sleep state of a running application is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that modifies the application sleep state of a running application is described. In one embodiment, the device reduces power consumption of the device by using a set of heuristics to determine whether an application is 'important' and whether to control the application's access to system resources (e.g., CPU percentage and/or frequency, graphics processing unit (GPU) access and/or frequency, rate of I/O access, timer access, etc.). For example, for an application that has a window which is not visible to the user (e.g., hidden behind a window), the application can request a one second timer, so the application can update its user interface (UI) every second. However, because the application is not visible to the user, it might not make sense to allow the application to update its UI every second. In this embodiment, the device can limit the applications ability to access the one-second timer.

In one embodiment, the application can restrict access to the device resources based on a set of heuristics using a list of application run-time characteristics. In this embodiment, the set of run-time characteristics can include: whether the application is a foreground application or background application, is the process an application (e.g., search indexing is not considered an application), does the application have a partial or fully visible window on the screen, whether the application is drawing on the display, whether the application is playing audio, whether a camera or microphone attached to the device is being used by the application, whether the display is on or off, and/or whether the user is interacting with the application.

In one embodiment, the application determines whether to restrict access to the device resources, to change this restriction, and/or remove the resource restrictions. In one embodiment, a set of restrictions to device resources is called an application sleep state. In this embodiment, the application monitors for application events to determine if the application should modify the application sleep state. If the application detects the event, the application evaluates the run-time characteristics of the application to determine if the application should indicate to the kernel that the application sleep state of the application should be modified. If the application does determine that the application sleep state should be modified, the application sends an application sleep state message to the kernel. In one embodiment, the application sleep state message includes directives about how the application sleep state should be modified. The kernel receives the message and modifies the application sleep state of the application accordingly.

Figure 1:
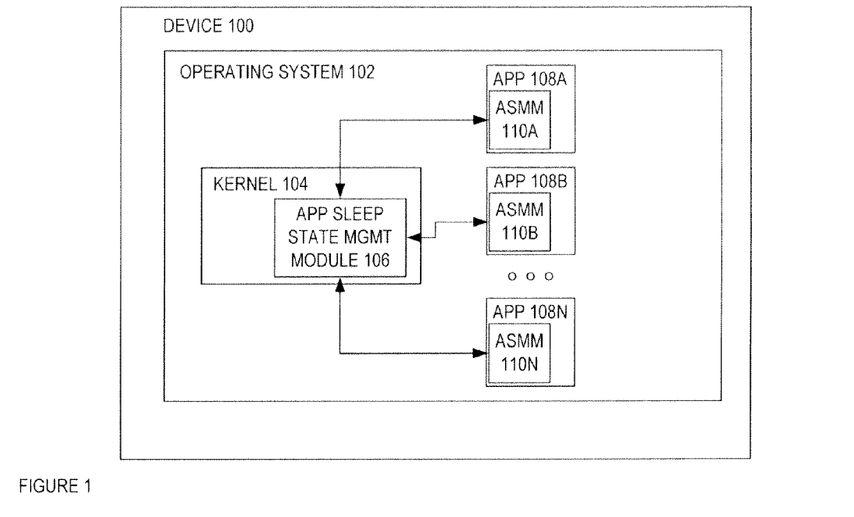
FIG. 1 is a block diagram of one embodiment of a device with multiple running applications.

FIG. 1 is a block diagram of one embodiment of a device 100 with multiple active applications. In one embodiment, the device 100 can be a personal computer, laptop, server, mobile device (e.g., smartphone, laptop, personal digital assistant, music playing device, gaming device, etc.), network element (e.g., router, switch, gateway, etc.), and/or any device capable of executing multiple applications. In one embodiment, the device 100 can be a physical or virtual device. In FIG. 1, the device 100 includes an operating system 102 that is a set of software used to manage the device's hardware resources and provides common services for other running the device's programs, such as running applications 108A-N. In one embodiment, the operating system 102 manages the different running applications 108A-N by time scheduling when a processor of the device 100 executes each of the running applications 108A-N. In one embodiment, a running application is an instance of a computer program that is being executed. In this embodiment, the running application 108A-N may be a user application that is executing as a result of user input. Examples of user applications are web surfing, word processing, email, social media, media processing, etc. Another example of a running application is a system process that provides one or more services to a user application, other applications, etc. In one embodiment, the running application 108A-N is one of the applications that are installed on a user's application launcher (e.g., a dock). In one embodiment, the applications 108A-N concurrently display multiple windows on a display of the device. In this embodiment, one of the applications 108A-N can display multiple windows concurrently and/or multiple applications 108A-N can concurrently display one or more windows. In one embodiment, a displayed window can be unoccluded window, a partially occluded window, or a minimized window. In another embodiment, the device 100 include a virtual memory subsystem that pages data between volatile and non-volatile storage. For example and in one embodiment, the virtual memory subsystem pages data of one or more of the applications 108A-N between the volatile and non-volatile storage of the device 100.

In one embodiment, the operating system 102 includes a kernel 104 that is a basic component of the operating system 102 and provides a level of abstraction for the device resources (e.g., processor, input/output systems, network resources, etc.). In addition, the kernel 104 can modify a sleep state of one or more of the running applications 108A-N. In one embodiment, the kernel 104 modifies the application sleep state in response to a request from that application 108A-N. In this embodiment, the application 108A-N monitors the activity of this application 108A-N and determines if a sleep state of the application 108A-N can be modified. In one embodiment, an application sleep state is a state that characterizes an application's access to one or more resources of the device. In this embodiment, an application sleep state can be a default access to the device resources that is set when the application is launched by the operating system. In another embodiment, an application sleep state can be a restricted access to one or more of the device resources. In addition, resources that the application 108A-N can access include: access to the central processing unit (CPU), amount of CPU computation time, input/output (I/O) prioritization, CPU frequency, GPU access, amount of GPU computation time, GPU frequency, timer access, maximum memory consumption, prioritization of access to real memory and/or virtual memory, and/or network I/O prioritization. In one embodiment, the application 108A-N can access non-memory resources (e.g., access to the CPU, amount of CPU computation time, input/output (I/O) prioritization, CPU frequency, GPU access, amount of GPU computation time, GPU frequency, timer access, network I/O prioritization, and/or other non-memory resources of the device 100.) In this embodiment, an application sleep state characterizes the application's access to one or more non-memory resources of the device 100. Different application sleep states give different levels of access to these device resources.

In one embodiment, an application that is running in a default state has default access to the device resources, which is a level of resource access. In one embodiment, the default state is a level of resource access if the device has not set the application in an application sleep state. In another embodiment, the default state is the device resource access set by the operating system at the launch time of the application. In a further embodiment, the default state is a resource access state used for when a user interacts with an application. An application sleep state that is not in the default state has further restricted access to one or more of the device resources. For example and in one embodiment, an application sleep state can be a state that restricts software times to be a minimum of one second for an application with a partially occluded window or a minimum of five seconds for an application with a fully occluded window. In one embodiment, this application sleep state can be used for an application that is not in foreground and is repeatedly updating window animation. In this embodiment, the application will use fewer resources updating the application animation (e.g., use CPU or graphics resources less frequently) and can conserve device resources. As another example, an application sleep state can be one where the application has no access to the CPU time, uses less CPU time or has less frequent access to the CPU time. In this example, an application may have a cap on the amount of CPU time the application can access during execution (e.g., not more than 50% of one CPU computing core). Furthermore, a CPU frequency refers to how often the application has access to the CPU. For example and in one embodiment, an application may have less than normal access to the CPU in terms of an amount of time (e.g., each execution time slice is small in this application sleep state) and/or a frequency of the application being scheduled by the operating system for execution by the CPU. As another example and embodiment, an application in an application sleep state may have a reduced I/O priority such that the application in this state would have less access to I/O (e.g., disk, solid state storage, network access, or another type if I/O). In one embodiment, a foreground application is an application that has an active window, whereas a background application is an application that does not have the active window.

In one embodiment, each application 108A-N evaluates run-time characteristics of that application 108A-N to determine if the application sleep state should be modified. In one embodiment, the run-time characteristics can be whether the application has certain launch time characteristics (e.g., can be launched as a foreground application, configured to or not to enter application sleep), whether the application is in the foreground or background, whether the application has not drawn in an unoccluded window region in the last 30-60 seconds, whether the application is playing audio, whether the application is or is not connected to a video camera, still camera, or microphone input device (e.g., a webcam or built-in camera) and receiving input from them, whether the application is processing a user event, whether the application is within a grace period window of 30 seconds after a launch of the application, whether the application is holding a power assertion (e.g., a "no display sleep" or "no idle system sleep" power assertion), the application has opted out of application sleep (e.g., the application or a library the application uses out of application sleep while launching, processing certain events, saving documents, whether the display is on or off, or during other functions. In one embodiment, a display that is off can be a display that is physically powered off or can in a reduced power state in which the display is physically powered on but is in a lower powered state (e.g., blank screen, screen saver on, etc.).

In one embodiment, if one, some, or all of the run-time characteristics are met, the application 108A-N sends a message to the kernel 104 to have the kernel set the application sleep state for the requesting application 108A-N. In this embodiment, the application 108A-N monitors the run-time characteristics of that application 108A-N instead of another process or component (e.g., kernel or other operating system component). In one embodiment, each of the applications 108A-N includes an application sleep management module 110A-N, respectively, that monitors for application events and evaluates the run-time characteristics of the application 108A-N to determine if the application sleep state is to be modified. For example and in one embodiment, if the application 108A-N can be launched as a foreground application, is configured that can enter an application sleep state, and has not drawn in an unoccluded window region in the last 30-60 seconds, the application sleep management module 110A-N could determine that the corresponding application 108A-N should enter an application sleep state. In this embodiment, the application sleep state could be reduced access to the CPU (e.g., capping the application use of the CPU to a certain percentage), reduced CPU frequency (e.g., lowering the application CPU priority or importance), smaller memory consumption maximum, reduced timer access, reduced I/O prioritization, reduced network I/O prioritization, reduced memory prioritization, or another restricted access to the device 100 resources. In one embodiment, in the message sent to the kernel, the application sleep management module 110A-N could give directives to the kernel as to which application sleep state would be appropriate for the application. The application can indicate that the user has explicitly initiated an activity or action and it should be allowed to not enter an application sleep state. For example, the user may tell the application to batch process a set of files. The application can indicate to the kernel that the application is doing important work on behalf of the user. For example and in one embodiment, if the example above for an application that has not drawn in an unoccluded window for 30-60 seconds, the application sleep management module 110A-N could directive that the CPU percentage maximum or CPU frequency be reduced in the message sent to the kernel. Determining an application sleep state change is further described in FIG. 3 below. In one embodiment, the application sleep state management module 110A-N is separate from the running applications 108A-N. In this embodiment, the application sleep management module 110A-N can be part of a different entity of the device (e.g., the kernel 104, operating system 102, another application, or another process). In one embodiment, there can a different application sleep management module 110A-N for each application 108A-N, and/or one application sleep management module 110A-N for some or all of the applications 108A-N.

In one embodiment, the kernel 104 includes an application sleep state management module 106 to receive the messages from the applications 108A-N regarding modifications to the application sleep state for that application 108A-N. In this embodiment, the application sleep state management module 106 receives the message, interprets the directives in the messages, determines an appropriate application sleep state, and sets the application sleep state for that application. In one embodiment, the application sleep state management module 106 determines an application sleep state by using the directives included in the message. In addition, the application sleep state management module 106 invokes kernel and/or operating system functions to restrict the application access to the resources for this application sleep state. For example and in one embodiment, the application sleep state management module 106 invokes operating system function to modify a CPU maximum percentage, CPU frequency, timer access, I/O priority, network I/O priority, memory consumption maximum, and/or memory priority. Receiving the application state sleep message and setting the application sleep state is further described in FIG. 4 below. In one embodiment, the application sleep state management module 110A-N is separate from the kernel 104. In this embodiment, the application sleep state management module 110A-N can be part of a different entity of the device (e.g., the operating system 102, another application, or another process).

Figure 2:
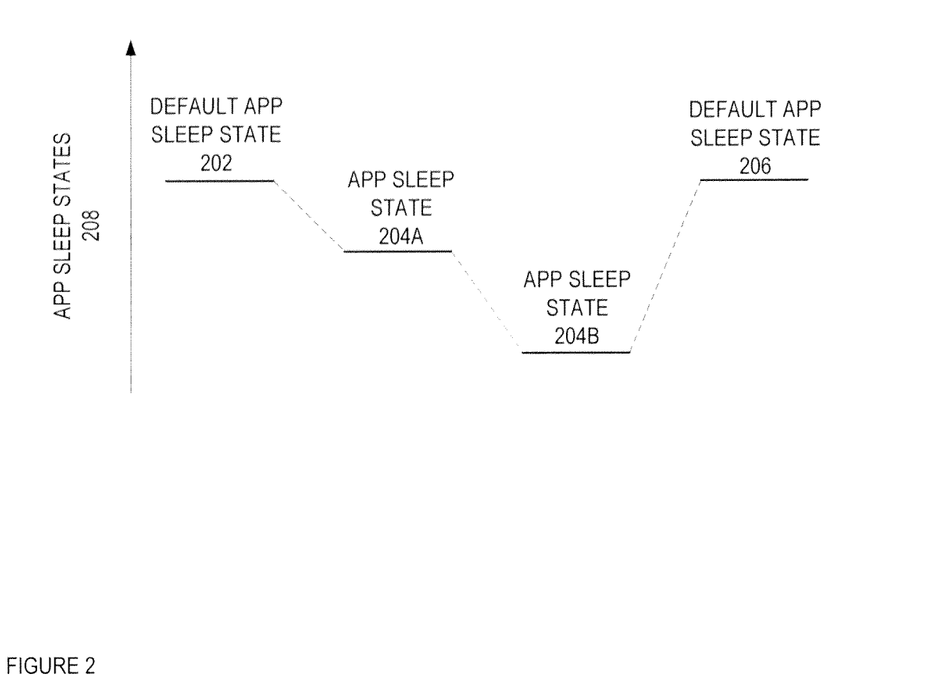
FIG. 2 is an illustration of one embodiment of application sleep states.

As described above, an application can be put into an application sleep state, where the application sleep state further restricts access for the application to the device resources. In one embodiment, an application sleep state can include one or more restrictions of device resources for the application. FIG. 2 is an illustration of one embodiment of application sleep states. In FIG. 2, after an application is launched by the operating system, the application runs in a default application sleep state 202. In default mode, the application does not have any restrictions to device resources apart from the resource restrictions set by the operating system for that application. For example and in one embodiment, the application would have unrestricted access to the CPU, CPU percentage, CPU frequency, I/O components, network I/O, timers, and memory. In one embodiment, the application determines that the application is a candidate to have the application enter one of the application sleep states 204A-B. For example and in one embodiment, the application determines that an application window is partially occluded. Since this window is partially occluded, the work done (e.g., redrawing the application window) may not need to be done as often. In this embodiment, the application sends a message to the kernel indicating the application should enter an application sleep state, e.g., application sleep state 204A. The application sleep state 204A has greater restrictions to device resources than the default application sleep state 202. For example and in one embodiment, the application sleep state 204A may have a cap of CPU percentage (e.g., 25%), a reduction in CPU frequency (e.g., the application will get a CPU time slice at a reduced frequency than compared in a default state), lower I/O prioritization, lower network I/O prioritization, lower memory prioritization, smaller memory consumption maximum, restricting timers (e.g., to be a minimum of a second), and/or a combination thereof.

In another embodiment, the application further determines that the application can be put into another application sleep state 204B. In this embodiment, the application sleep state 204B can be one with greater resource restrictions than the current application sleep state 204A. For example and in one embodiment, the application determines that an application window is fully occluded. Since this window is fully occluded, the work done (e.g., redrawing the application window) may not need to be done as often. In this example, because the window is fully occluded, the application can be restricted to fewer device resources than in default application sleep state 202 or application sleep state 204A. For example and in one embodiment, application sleep state 204B may restricts timers to be at least five seconds, instead of a timer restriction of one second in application sleep state 204A. In an alternative embodiment, application sleep state 204B may have fewer device access restrictions that state 204A, but have more device access restrictions than the default application sleep state 202.

In a further embodiment, the application determines that the application should be taken from an application sleep state (e.g., application sleep state 204B) back to the default application sleep state (e.g., state 206). For example and in one embodiment, the application may receive an event indicating that the application has moved from a background state to a foreground state. In this example, a user may click on the window of the application to bring the application in foreground from background.

In another embodiment, the application can be launched in an application sleep states (e.g., application sleep state 204A or 204B) instead of the default state. In this embodiment, the application is launched in application sleep state (e.g., application sleep state 204A) and can transition to the default state 202 or 206 based on an event in the device. For example and in one embodiment, the application may detect an event indicating that the application has moved from a background state to a foreground state. In this example, a user may click on the window of the application to bring the application in foreground from background. In another example, the event triggering a change from an application sleep state to the default state can be an application starting to play audio.

Figure 3:
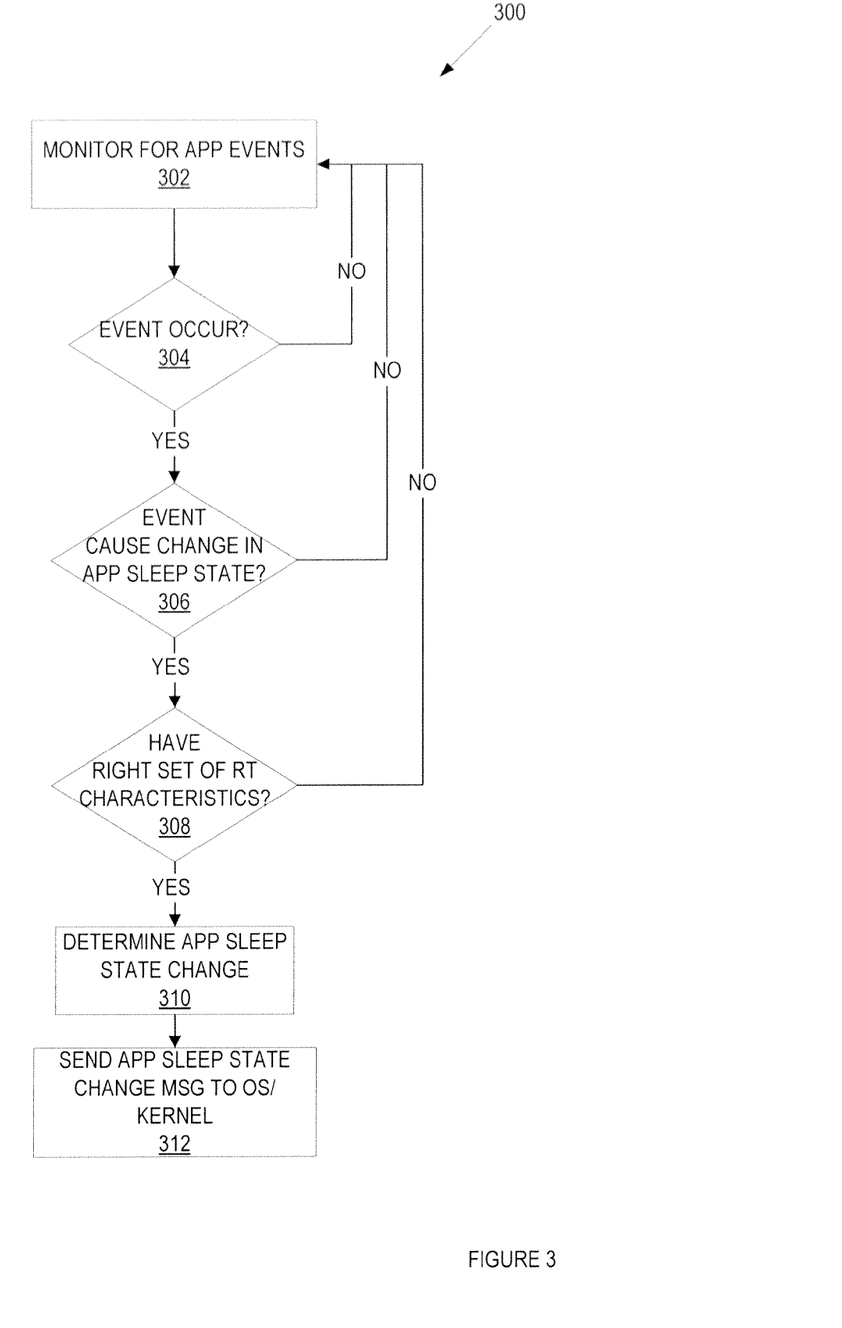
FIG. 3 is a flowchart of one embodiment of a process to detect an event that causes a modification of an application's sleep state.

As described above, an application can determine when the application can enter or modify an application's sleep state and signal the kernel to do so. FIG. 3 is a flowchart of one embodiment of a process 300 to detect an event that causes a modification of an application's sleep state. In one embodiment, process 300 is performed by an application sleep management module such as the application sleep management module 110A-N of FIG. 1 that is described above. In FIG. 3, process 300 begins by monitoring the application for application events at block 302. In one embodiment, the application events can be an event that may affect whether the application should enter an application sleep state. In one embodiment, an application event could be a transition from foreground to background (or vice versa), full or partial occlusion of the application window, minimizing of one or more the application window(s), the application starting or ceasing playing audio, detection of a connection or disconnection to a camera or microphone input device (video camera, still camera, other type of camera, and/or microphone) and receiving input (or not receiving input) from them, if the application is processing a user event (or ceases processing a user event), the application entering/expiration of a grace period, holding/releasing of a power assertion, opting in or out of application sleep, a change in display status (e.g., a display going for being on to off (powered off or turned off to save power), or visa versa), or another type of event that would allow, disallow, otherwise affect an application sleep state, or some other application event.

At block 304, process 300 determines if the event occurred. If no event has occurred, process 300 proceeds to block 302 above. If an event occurred, at block 306, process 300 determines if the event can cause a change in the application's sleep state. In one embodiment, the change in the application sleep state can be entering an application sleep state from a default state, exiting an application sleep state to a default state, or changing from one application sleep state to another sleep state. In one embodiment, an event that may cause a change in the application's sleep state could be a transition from foreground to background (or vice versa), full or partial occlusion of the application window, minimizing of one or more the application window(s), the application starting or ceasing playing audio, detection of a connection or disconnection to a camera or microphone input device (video camera, still camera, other type of camera, and/or microphone) and receiving input (or not receiving input) from them, if the application is processing a user event (or ceases processing a user event), the application entering/ expiration of a grace period, holding/releasing of a power assertion, opting in or out of application sleep, or another type of event that would allow, disallow, otherwise affect an application sleep state.

In one embodiment, in addition to being an event that could cause a change in the application sleep state, the application may additionally need to have a correct set of run-time characteristics to cause a change. In one embodiment, process 300 evaluates the run-time characteristics at block 308. In one embodiment, the set of run-time characteristics for an application to enter an application sleep state could be one, some, all, or none of the following run-time characteristics: the application has certain launch time characteristics (e.g., can be launched as a foreground application, configured to or not to enter application sleep); the application is not in the foreground; the application has not drawn in an unoccluded window region in the last 30-60 seconds; the application is not playing audio; the application is not connected to a video camera, still camera, or microphone input device (e.g., a webcam or built-in camera) or is connected to the video camera, still camera, or microphone input device but is not receiving input from them; the application is processing a user event; the application is not within a grace period window of 30 seconds after a launch of the application; the application is not holding a power assertion (e.g., a "no display sleep" or "no idle system sleep" power assertion); the application has not opted out of application sleep (e.g., the application or a library the application uses out of application sleep while launching, processing certain events, saving documents, or during other functions); if the application does not have an unpublished user default; or another type of run-time characteristic that would allow of prevent a modification of the application sleep state. If the application does not have the right set of run-time characteristics, execution proceeds to block 302 above.

If the application has the correct set of run-time characteristics, process 300 determines the application sleep state change at block 310. In one embodiment, process 300 determines which resource restrictions that are appropriate to the sleep state. In this embodiment, process 300 would directive to the kernel the resource restrictions that process 300 determines are appropriate. For example and in one embodiment, if the application is in the default state, the event indicates that the application window is partially occluded, and the application is in the background and has not drawn in an unoccluded window region in 30-60 seconds, process 300 could directive to the kernel that the application sleep state change would be to a sleep state that could be reduced access to the CPU (e.g., no access to the CPU, capping the application use of the CPU to a certain percentage), reduced CPU frequency (e.g., lowering the application CPU priority or importance), timer restrictions, reduced I/O prioritizations, reduced network I/O prioritizations, reduced memory prioritization, smaller memory consumption maximum, or another restricted access to the device resources. As another example and another embodiment, process 300 could determine that a partially occluded window event could cause a change to a sleep state that restricts timers to be at least one second for the application. In a further example and embodiment, process 300 could determine that a fully occluded window event could cause a change to a sleep state that restricts timers to be at least five seconds for the application.

At block 312, process 300 sends an application sleep state message to the kernel. In one embodiment, process 300 sends this message to the application sleep state management module of the kernel, such as the application sleep state management module 106 as illustrated in FIG. 1 above. In one embodiment, the application sleep state message identifies the sending application and/or includes the directives determined at block 308. For example and in one embodiment, the directives could indicate that the application should have reduced access to the CPU (e.g., no access to the CPU, capping the application use of the CPU to a certain percentage), reduced CPU frequency (e.g., lowering the application CPU priority or importance), timer restrictions, reduced I/O prioritizations, reduced network I/O prioritizations, reduced memory prioritization, smaller memory consumption maximum, or another restricted access to the device resources. Processing of the application sleep state message is further described in FIG. 4 above.

Figure 4:
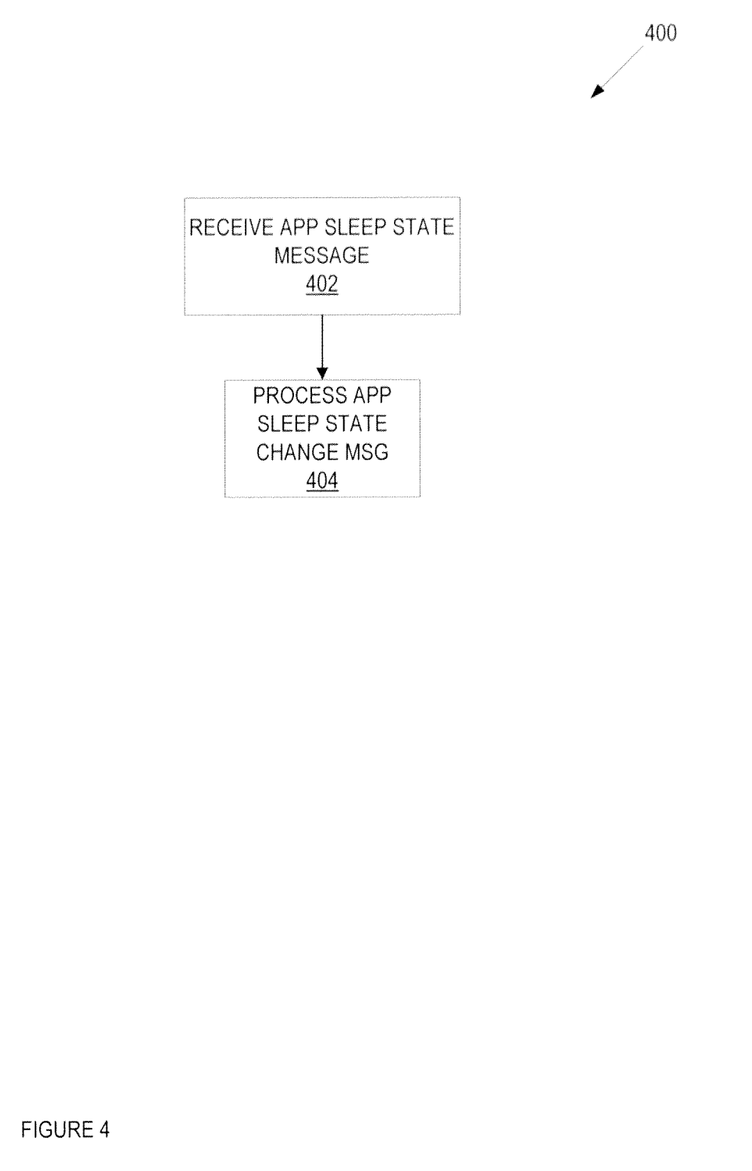
FIG. 4 is a flowchart of one embodiment of a process to modify an application's sleep state.

FIG. 4 is a flowchart of one embodiment of a process 400 to modify an application's sleep state. In one embodiment, process 400 is performed by an application sleep management module, such as the application sleep state management module 106 as illustrated in FIG. 1 above. In FIG. 4, process 400 begins by receiving an application sleep state message at block 402. In one embodiment, the application sleep state message is a message from these applications that indicates a change in that applications sleep state. In this embodiment, the application determines when to enter an application sleep state from a default state, exit an application sleep state to the default state, or changes from one application sleep state to another sleep state. In another embodiment, another process determines if the application should change its sleep state. In this embodiment, process 400 receives this determination via the application sleep state message as describe above in FIG. 3.

At block 404, process 400 processes the application sleep state message. In one embodiment, the application sleep state message includes directives about which sleep state the application should transition to. In this embodiment, process 400 retrieves the directives from the message and determines from the directives what sleep state is appropriate for the application that originated the application sleep state message. In this embodiment, process 400 retrieves the directives in the message and applies operating system functions to restrict the application's access to the device resources. For example and in one embodiment, process 400 can apply operating system functions to reduce the application access to the CPU percentage (e.g., capping the application use of the CPU to a certain percentage), CPU frequency (e.g., lowering the application CPU priority or importance), timers, I/O, or another restricted access to the device resources. Alternatively, the directives may indicate to process 400 to remove current resource restrictions for the application. In one embodiment, if the application determines that the application should return to a default state, the application sleep state message would include directives that indicate the application should return to a default state. In this embodiment, process 400 applies operating system functions to return the application to a default state. In one embodiment, a default state of the running application is a level of resource access if the device has not set the application in an application sleep state.

Figure 5:
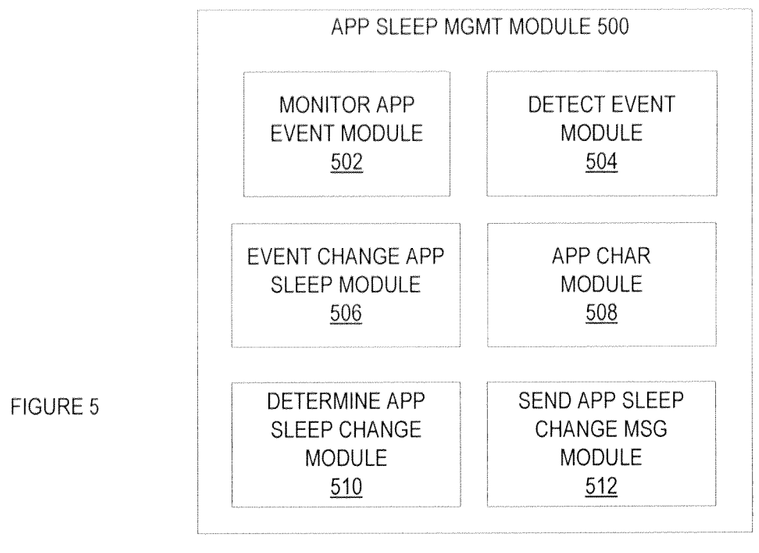
FIG. 5 is a block diagram of one embodiment of an application sleep management module to detect an event that causes a modification of an application's sleep state.

FIG. 5 is a block diagram of one embodiment of an application sleep management module 500 to detect an event that causes a modification of an application's sleep state. In one embodiment, the application sleep management module 500 is one of the application sleep management modules 110A-N as described in FIG. 1 above. In one embodiment, the application sleep management module 500 includes monitor application event module 502, detect event module 504, event change application sleep module 506, application characteristics module 508, determine application sleep change module 510, and send application sleep change message module 512. In one embodiment, the monitor application event module 502 monitors the application for an event as described in FIG. 3 at block 302 above. The detect event module 504 detects an application event as described in FIG. 3 at block 304 above. The event change application sleep module 506 determines if the application event causes a change in the application sleep state as described in FIG. 3 at block 306 above. The application characteristics module 508 determines if the application has the correct set of run-time characteristics as described in FIG. 3 at block 308 above. The determine application sleep change module 510 determines the application sleep state change as described in FIG. 3 at block 310 above. The send application sleep change message module 512 sends the application sleep state message as described in FIG. 3 at block 312 above.

Figure 6:
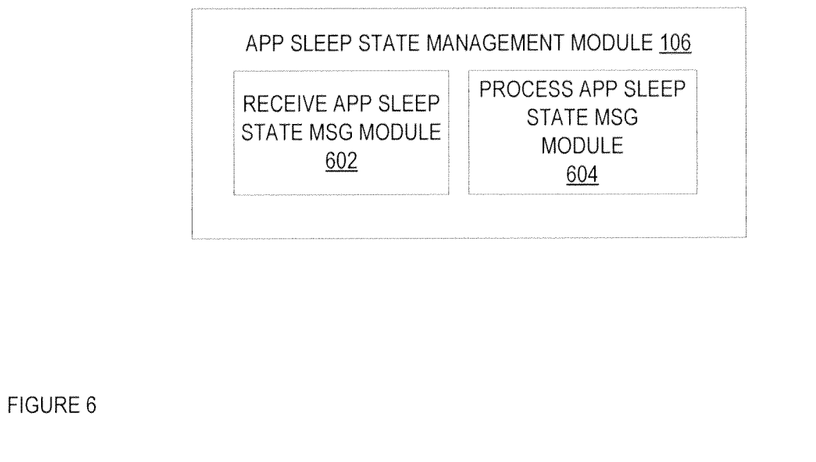
FIG. 6 is a block diagram of one embodiment of an application sleep state management module to modify an application's sleep state.

FIG. 6 is a block diagram of one embodiment of an application sleep state management module 106 to modify an application's sleep state. In one embodiment, the application sleep modifier module 106 includes a receive application sleep state message 602 and process application sleep state message module 604. In one embodiment, the receive application sleep state message 602 receives an application sleep state message as described in FIG. 4 at block 402 above. The process application sleep state message module 604 process the application sleep state message as described in FIG. 4 at block 404 above.

Figure 7:
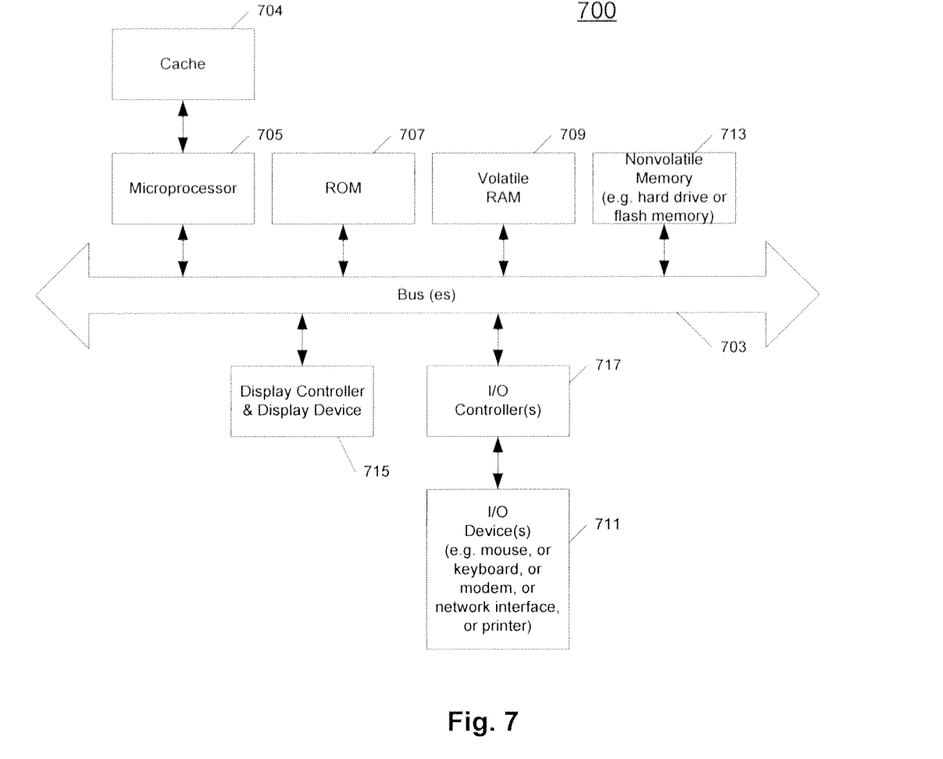
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented including a device 100 as shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may include one or more CPU(s), GPU(s), a specialized processor, and/or a combination thereof. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, printers and other devices which are well known in the art. Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD RAM or a flash memory or other types of memory systems, which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Figure 8:
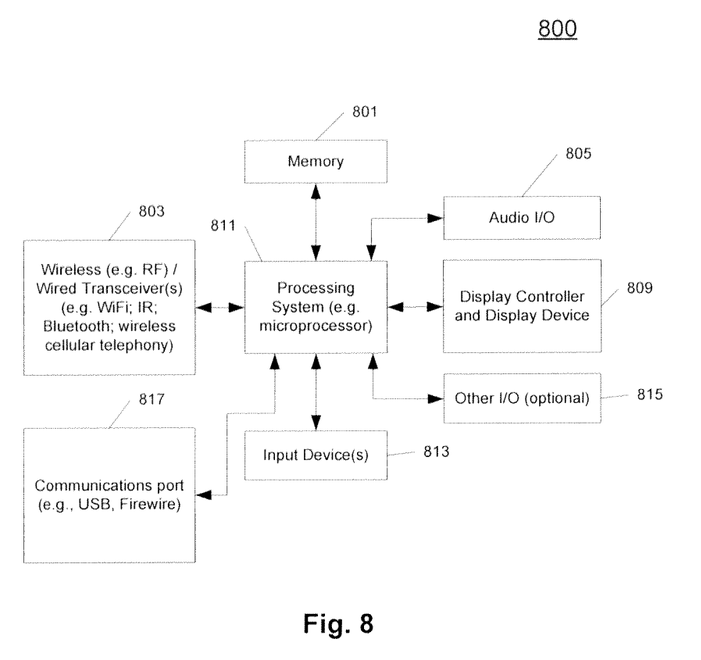
FIG. 8 shows an example of a data processing system, which may be used with one embodiment of the present invention.

FIG. 8 shows an example of another data processing system 800 which may be used with one embodiment of the present invention. For example, system 800 may be implemented as a device 100 as shown in FIG. 1. The data processing system 800 shown in FIG. 8 includes a processing system 811, which may be one or more microprocessors, or which may be a system on a chip integrated circuit, and the system also includes memory 801 for storing data and programs for execution by the processing system. The system 800 also includes an audio input/output subsystem 805, which may include a microphone and a speaker for, for example, playing back music or providing telephone functionality through the speaker and microphone.

A display controller and display device 809 provide a visual user interface for the user; this digital interface may include a graphical user interface which is similar to that shown on a Macintosh computer when running OS X operating system software, or Apple iPhone when running the iOS operating system, etc. The system 800 also includes one or more wireless transceivers 803 to communicate with another data processing system, such as the system 800 of FIG. 8. A wireless transceiver may be a WLAN transceiver, an infrared transceiver, a Bluetooth transceiver, and/or a wireless cellular telephony transceiver. It will be appreciated that additional components, not shown, may also be part of the system 800 in certain embodiments, and in certain embodiments fewer components than shown in FIG. 8 may also be used in a data processing system. The system 800 further includes one or more communications ports 817 to communicate with another data processing system, such as the system 1500 of FIG. 15. The communications port may be a USB port, Firewire port, Bluetooth interface, etc.

The data processing system 800 also includes one or more input devices 813, which are provided to allow a user to provide input to the system. These input devices may be a keypad or a keyboard or a touch panel or a multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 800 may be a network computer or an embedded processing device within another device, or other types of data processing systems, which have fewer components or perhaps more components than that shown in FIG. 8.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "evaluating," "receiving," "determining," "computing," "sending," "modifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to modify an application sleep state of a running application of a device, the method comprising:

detecting, with the running application, an event associated with the running application;

evaluating one or more run-time characteristics of the running application;

determining if the running application is a candidate to have the application sleep state of that running application modified based on the monitored one or more run-time characteristics of the running application and the event; and if the running application is a candidate to have the application sleep state of that running application modified, sending a message from the running application to an application sleep state management module of an operating system of the device, the message indicating how the application sleep state of the running application is to be modified, wherein the device includes a virtual memory subsystem that pages data of the running application between volatile storage to non-volatile storage, the operating system modifies the application sleep state of the running application in response to receiving the message, and the modified application sleep state for the running application is a reduced state in which the running application has reduced access to a set of resources of the device.

2. The non-transitory machine-readable medium of claim 1, wherein the reduced access to the set of resources of the device is a reduction of a resource access from a default state of the running application, wherein the default state of the running application is a level of device resource access.

3. The non-transitory machine-readable medium of claim 1, wherein the set of resources of the device are selected from the group consisting of central processing unit access usage, central processing unit frequency, graphics processing unit access, timer access, input/output priority, memory consumption, memory prioritization access, and network input/output prioritization.

4. The non-transitory machine-readable medium of claim 1, wherein the modification to the application sleep state is a transition from a default state to the reduced state, wherein the default state of the running application is a level of device resource access.

5. The non-transitory machine-readable medium of claim 1, wherein a run-time characteristic is selected from the group consisting of whether the running application is a foreground application or background application, does the running application have a partial or fully visible window on a screen, whether the running application is drawing on a display, whether the running application is playing audio, a change in whether a camera or microphone is being used by the running application, whether the display is on or off, and whether a user is interacting with the running application.

6. The non-transitory machine-readable medium of claim 1, wherein the event is selected from the group consisting of a transition from foreground to background, a transition from background to foreground, occlusion of an application window, modifying audio playing, a change to the usage of or coupling of a camera or microphone coupled to the device, the running application is processing a user event, an expiration of a grace period, change in a power assertion, a change in display status, and change in an application sleep setting.

7. The non-transitory machine-readable medium of claim 1, wherein the modification to the application sleep state is a transition from a reduced access to a device resource to a default state of the running application, wherein the default state of the running application is a level of device resource access.

8. The non-transitory machine-readable medium of claim 1, wherein the message includes a directive about how to modify the application sleep state.

9. The non-transitory machine-readable medium of claim 1, wherein an operating system modifies the application sleep state of the running application based on the message.

10. A non-transitory machine-readable medium having executable instructions to cause one or more processing units to perform a method to modify an application sleep state of a running application of a device, the method comprising:
receiving, with an operating system of the device, an application sleep state message from an application sleep management module of the running application, wherein the application sleep state message includes a directive about how to modify the application sleep state that was determined by the running application; and
modifying the application sleep state of the one of the plurality of running application based on the directive, wherein the device includes a virtual memory subsystem that pages data of the running application between volatile storage to non-volatile storage, wherein the modified application sleep state for the running application is a reduced state in which the running application has reduced access to a set of resources of the device.

11. The non-transitory machine-readable medium of claim 10, wherein the reduced access to the set of resources of the device is a reduction of a resource access from a default state of the running application, wherein the default state of the running application is an initial setting of a resource access set when the running application was launched by an operating system.

12. The non-transitory machine-readable medium of claim 11, wherein the modification to the application sleep state is a transition from a reduced access to a device resource to the default state of the running application.

13. A method to modify an application sleep state of a running application of a device, the method comprising:
detecting, with the running application, an event associated with the running application;
evaluating one or more run-time characteristics of the running application;
determining if the running application is a candidate to have the application sleep state of that running application modified based on the evaluated one or more run-time characteristics of the running application and the event; and
if the running application is a candidate to have the application sleep state of that running application modified,
sending a message from the running application to an application sleep state management module of an operating system of the device, the message indicating how the application sleep state of the running application is to be modified, wherein the device includes a virtual memory subsystem that pages data of the running application between volatile storage to non-volatile storage, the operating system modifies the application sleep state of the running application in response to receiving the message, and the modified application sleep state for the running application is a reduced state in which the running application has reduced access to a set of resources of the device.

14. The method of claim 13, wherein a run-time characteristic is selected from the group consisting of whether the running application is a foreground application or background application, does the running application have a partial or fully visible window on a screen, whether the running application is drawing on a display, whether the running application is playing audio, a change in whether a camera or microphone being used by the running application, whether the display is on or off, and whether a user is interacting with the running application.

15. The method of claim 13, wherein the event is selected from the group consisting of a transition from foreground to background, a transition from background to foreground, occlusion of an application window, modifying audio playing, a change to the usage of or coupling of a camera or microphone coupled to the device, the running application is processing a user event, an expiration of a grace period, change in a power assertion, change in display status, and change in an application sleep setting.

16. A device to modify an application sleep state of a running application of the device, the device comprising:
a processor;
a memory coupled to the processor though a bus;
a virtual memory subsystem to page data of the running application between volatile storage to non-volatile storage; and
a process executed from the memory by the processor causes the processor to detect, with the running application, an event associated with the running application, evaluate one or more run-time characteristics of the running application, determine if the running application is a candidate to have the application sleep state of that running application modified based on the evaluated one or more run-time characteristics of the running application and the event, and if the running application is a candidate to have the application sleep state of that running application modified, send a message from the running application to an operating system of the device, the message indicating how the application sleep state of the running application is to be modified, wherein the operating system modifies the application sleep state of the running application in response to receiving the message, and the modified application sleep state for the running application is a reduced state in which the running application has reduced access to a set of resources of the device.

* * * * *